Oct. 31, 1939. L. W. BROWN 2,178,014
HELICOPTER
Filed Jan. 7, 1939  2 Sheets-Sheet 1

INVENTOR
Lawrence W. Brown.
BY
Arthur W. Brown
ATTORNEY

Oct. 31, 1939.    L. W. BROWN    2,178,014
HELICOPTER
Filed Jan. 7, 1939    2 Sheets-Sheet 2
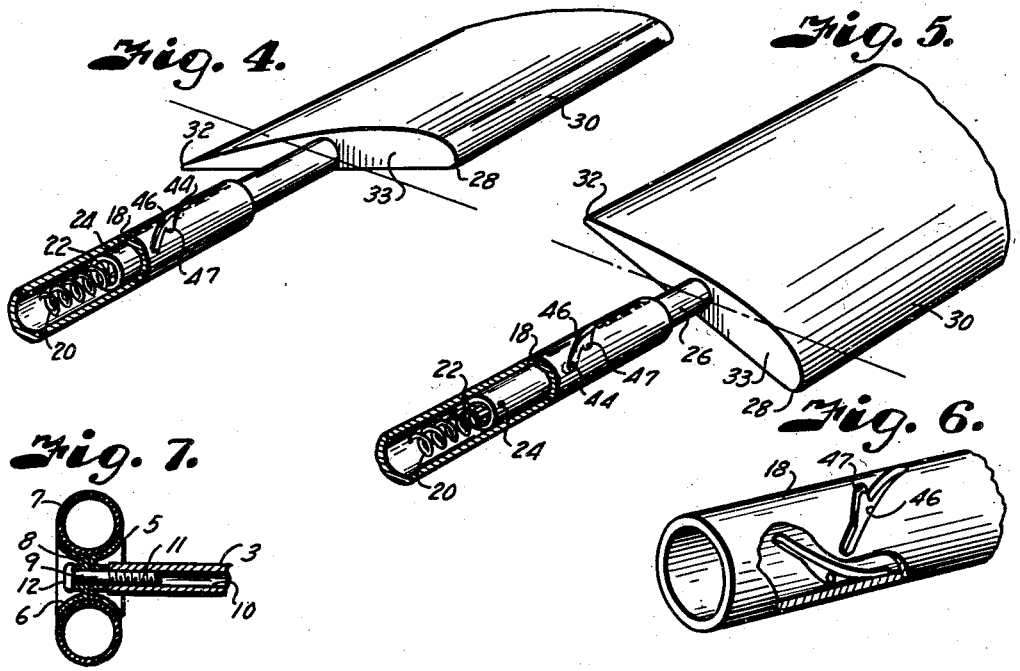
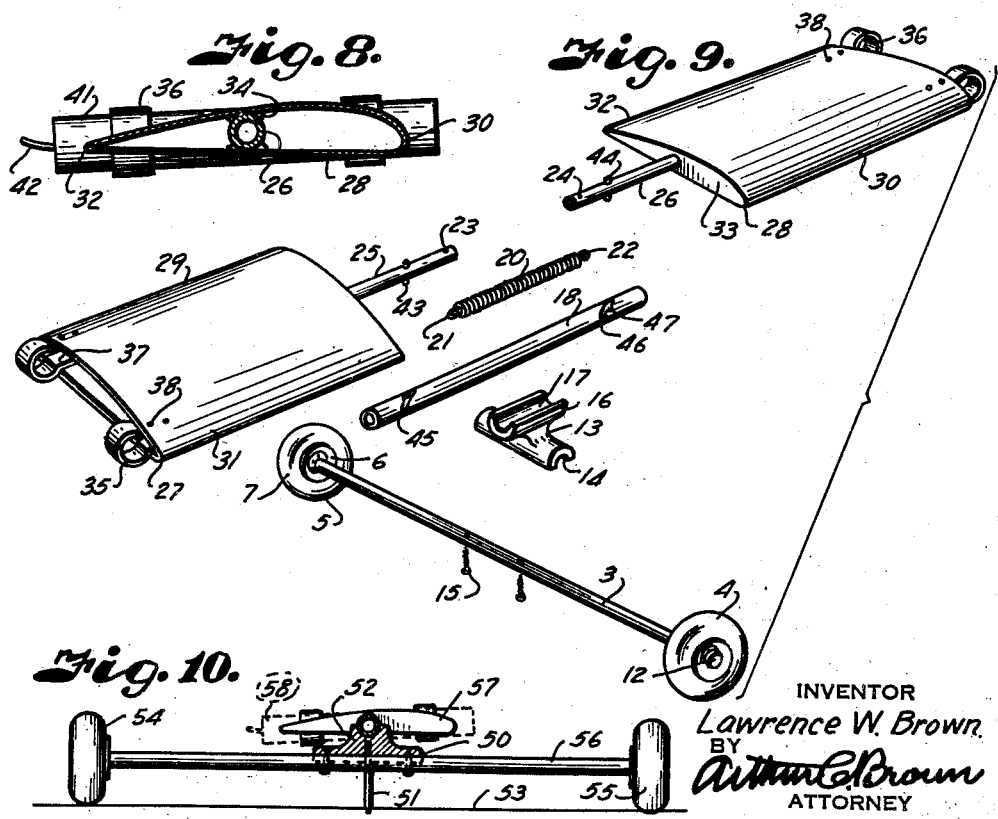
INVENTOR
Lawrence W. Brown
BY
Arthur C. Brown
ATTORNEY Patented Oct. 31, 1939

2,178,014

UNITED STATES PATENT OFFICE 2,178,014

HELICOPTER

Lawrence W. Brown, Clinton, Mo.

Application January 7, 1939, Serial No. 249,762

8 Claims. (Cl. 102—20)

This invention relates to helicopters and more particularly to a device of that character provided with rocket, or similar, propulsion of the lifting element thereof.

The principal object of the present invention is to provide a helicopter which "takes-off" from a support under its own power and which settles from flight in such a manner as to avoid damage thereto.

Another important object of the invention is to provide for adjustment of the lifting element, or elements, to the end that the lifting forces of the helicopter may be increased from a neutral "take-off" setting to a relatively great "lift" setting and then decreased upon reduction of application of driving force to provide the helicopter with a safe landing rate of descent.

Other important objects of the present invention are to provide improved elements and arrangements of elements in a machine of this character, and to provide a durable, easily operated and efficient helicopter capable of employment as a toy.

In accomplishing these and other objects of the present invention, I have provided improved details of structure, the preferred forms of which are illustrated in the accompanying drawings, wherein:

Fig. 4 is a detail perspective view of a part of the lifting element of the helicopter in lifting or ascending condition.

Fig. 5 is a perspective view similar to Fig. 4 illustrating the lifting element in descending condition, parts of the lifting element support being broken away to better illustrate the relation of the coacting parts thereof.

Fig. 6 is a detail perspective view of the main lifting element supporting member and particularly illustrates the adjusting slots for determining the angle of incidence of the leading edges of the lifting element.

Fig. 7 is a detail vertical cross-section through a wheel portion of the landing gear on the line 7—7, Fig. 2.

Fig. 8 is a vertical longitudinal section through a portion of the lifting element on the line 8—8, Fig. 2.

Fig. 9 is a detail perspective view of my improved helicopter, the relative parts thereof being shown in disassembled spaced relation.

Fig. 10 is an elevational view of a modified form of helicopter landing gear, the helicopter lift element being shown in substantially central transverse section.

Figure 1:
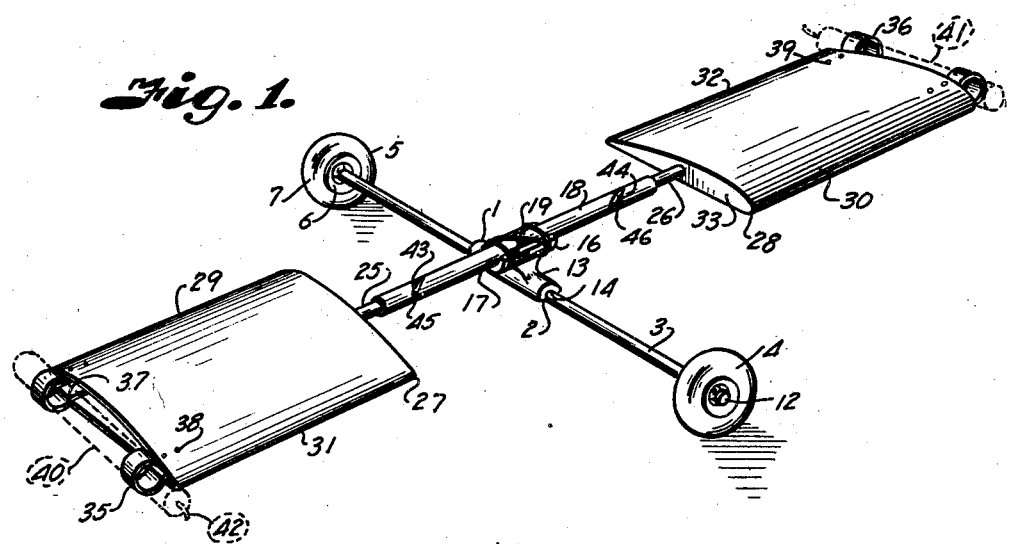
Fig. 1 is a perspective view of a helicopter embodying the features of the present invention, the propulsion elements being shown in dotted lines.

Referring more in detail to the drawings:

1 generally designates a helicopter embodying the features of the present invention and which preferably includes a landing gear 2 consisting of a substantially rigid axle 3 having wheels 4 and 5 rotatably mounted on the opposite ends thereof. The wheels each include circular members 6, Fig. 7, having annular peripheral grooves for seating pneumatic, or like, tires 7. The wheels are provided with hubs 8 which are preferably centrally bored to receive spindles 9 suitably fixed at the ends of a bore 10 in the axle 3, as indicated at 11, heads 12 on the spindles retaining the wheels on the axle and admitting of rotation of the wheels upon the spindles relative to the axle.

Mounted on the axle 3 is a bolster 13 or the like having an axle engaging portion provided with a groove 14 to seat upon the axle in longitudinal relation thereto, the bolster 13 preferably being centrally disposed relative to the length of the axle and being retained in such position by suitable fastening devices 15 extending through the axle and engaging the bolster. 16 designates a member which is a duplicate of the bolster portion just described and which is preferably integrally connected with the axle engaging portion in transverse relation thereto, the member 16 having a groove 17 extending throughout its length and opening upwardly to seat a lifting element supporting sleeve 18.

Figure 2:
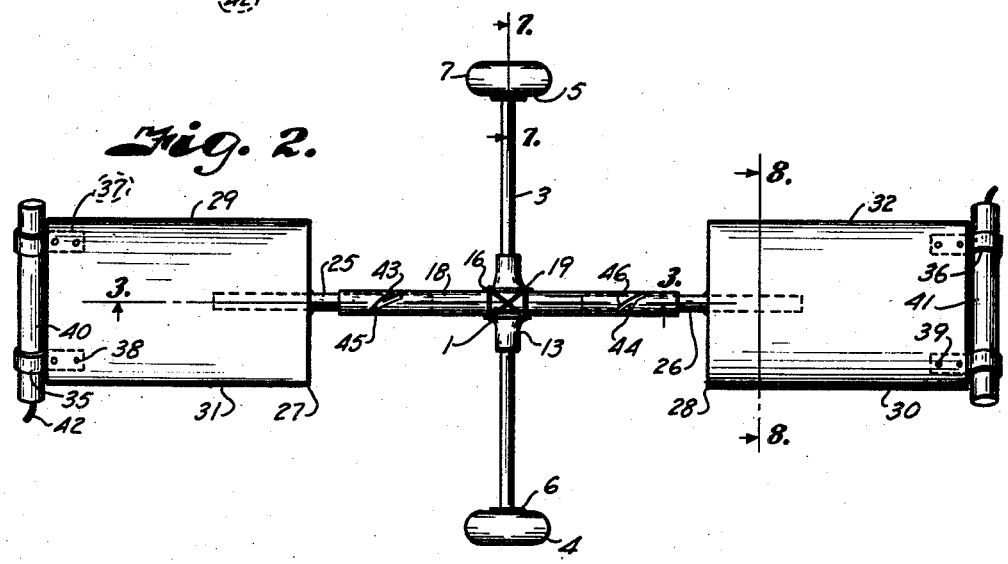
Fig. 2 is a plan view of the helicopter illustrated in Fig. 1, the wing supports being shown in dotted lines.
Figure 3:
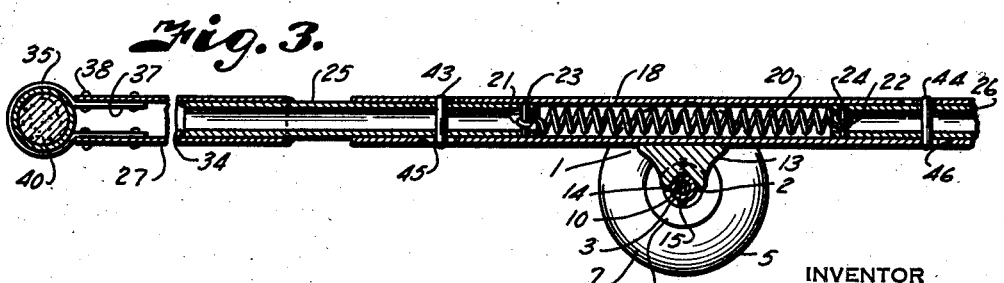
Fig. 3 is a vertical longitudinal section through the helicopter on the line 3—3, Fig. 2.

The sleeve 18 seats in the groove of the bolster portion 16 at a point intermediate the ends of the sleeve and is secured in such position in a suitable manner, preferably by a tie or like member 19, Fig. 2, which may be wrapped about the sleeve, bolster and axle to interconnect those members and brace the same relative to each other.

Positioned in the sleeve 18 is a resilient member 20, such as a coil spring, having attaching members 21 and 22 at its ends engaged with pins 23 and 24 suitably mounted in the inner adjacent portions of arms 25 and 26. The arms 25 and 26 are of a diameter adapting them to be sleeved within the sleeve 18, and are of a length such that the outer ends thereof extend from the sleeve laterally of the axle 3. Wings 27 and 28 are mounted on the outer ends of the arms 25 and 26 respectively.

The wings 27 and 28 are preferably designed to be similar in arrangement to a streamlined airplane wing and have leading edges 29 and 30 appropriately curved to continue to substantially pointed tail edges 31 and 32 respectively. End plates 33 cover the inner adjacent ends of the wings and are provided with suitable openings to pass the arms 25 and 26, the wings also being secured to the arms in a suitable manner such as welding as at 34, Fig. 8, to secure the wings rigidly upon the arms 25 and 26.

The outer ends of the wings 27 and 28 are provided with spaced brackets 35 and 36 which are preferably of substantially U-shape having cylindrical heads and inwardly extending arms 37 mounted within the top and bottom walls of the wings and secured thereto respectively by fastening devices 38 and 39. The brackets 35 and 36 are to receive propulsion elements 40 and 41, preferably in the form of rockets, the rockets being arranged with their fuse ends 42 opposite the leading edges of the wings to which they are attached.

With the construction thus far described, it is apparent that the helicopter consisting of the axle 3, sleeve 18 and wings 27 and 28 secured to the sleeve through the arms 24 and 25, rotate when the rockets are ignited and set up a spinning motion in the helicopter which lifts itself from the ground under its own power at an angle of ascent depending upon the angle of incidence of the wings relative to the plane of the initial support for the helicopter.

While the wings may be permanently fixed in a position suitable for lifting the helicopter off the ground, I have found it preferable to provide for adjustment of the wings to the end that the helicopter may take off at an angle most suitable therefor. When the helicopter is off the ground, it is found desirable to increase the lift or incidence angle of the wings to increase the rate of ascent. Then, when the rockets have spent their power by burning, an arrangement is provided for reversing the angle of incidence of the wings to create a braking effect allowing the helicopter to descend at an angle and a rate which safeguards the device and prevents damage thereto as by avoiding crashing into the ground.

In carrying out the provision for adjusting the helicopter wings, the spring 20 is employed to hold the inner ends of the arms 25 and 26 in relatively close proximity depending upon the length of the spring. Each of the arms 25 and 26 is provided with pins 43 and 44 preferably arranged in parallel relation to the spring engaged pins 23 and 24, and extending laterally of the longitudinal axes of the arms, as clearly shown in Fig. 9. The pins 43 and 44 are arranged to ride in grooves in the sleeve 18, which grooves are duplicates, two oppositely disposed grooves 45 and 46 being provided at each end of the sleeve 18. The grooves 45 and 46 are of spiral contour and extend outwardly from opposite sides of the longitudinal axis of the sleeve, outwardly from the longitudinal axis of the axle, and inwardly and outwardly from neutral "setting" notches 47 in each of the grooves, the notches 47 being of a size to seat the pins 43 and 44.

The grooves 45 and 46 are further arranged to limit outward movement of the wings, under centrifugal force created by ignition and burning of the rockets, against tension of the spring 20 and are arranged to limit inward movement of the wings under tension of the spring 20, the limit of movement being predetermined by the length and steepness of the spiral of the grooves to turn the leading edges of the wings to a relatively steep angle of incidence in relation to the horizontal at the outward limit of movement, as illustrated in Fig. 4, and to a relatively steep descent or braking angle for the wings when in their inward limit of movement, as illustrated in Fig. 5.

The operation of a helicopter constructed as described is as follows:

Rockets of suitable propulsion type are applied to the brackets at the outer ends of the wings with their fuse ends pointing toward the tail edge and away from the leading edges of the wings. The helicopter is then placed on a suitable support, which is usually the ground in a sufficiently open space, in such a manner that the wheels of the landing gear rest on the ground and the lifting element or wings are positioned above the axle.

The wings are then preferably manually moved outwardly against tension of the spring 20 and the pins 43 and 44 of the wing arms 25 and 26 are aligned with the notches 47. The pins being moved into the notches of the sleeved grooves, the spring 20 retains the wings in set position as illustrated in Fig. 1, which position is of neutral character and best suited for a take-off.

The rockets are then preferably simultaneously ignited in a suitable manner, as by providing one of the rockets with a delayed or slower fuse, and the action of the rockets forces the leading edges of the wings into the air in opposite directions to set up a spinning or rotative movement in the helicopter. The helicopter soon rises and under continued action of the rockets, centrifugal force is built up to an extent sufficient to force the wings further outwardly. The effect of this is to create a greater angle of incidence for the wings because of the guiding action of the grooves 46 and 47 on the pins 43 and 44, the helicopter climbing faster, or being provided with a more rapid rate of ascent, because of the increased angle of incidence of the wings, the helicopter thus rising rapidly and for a time governed by the power of the rockets.

As soon as the rockets have burned out, their action ceases; the centrifugal force is lessened, and the spring 20 comes into play to draw the wings together. As the wings are drawn inwardly, the pins 43 and 44 ride inwardly in the grooves 45 and 46 of the sleeve and change the angle of incidence of the wings substantially from that shown in Fig. 4 to that shown in Fig. 5. As the angle of incidence of the wings passes the horizontal plane, a braking effect is produced which slows the rate of descent of the helicopter in proportion to its spinning action, the effect of which is enhanced by the force of gravity effecting bite of the leading edges of the wings into the air to continue the spinning or rotative action of the helicopter, the action slowing descent of the helicopter to a rate that does not cause damage to the device when it ultimately reaches the ground.

In Fig. 10, the modified form of landing gear 50 is illustrated, wherein a pivot pin 51 is mounted in a bolster 52 similar to that described in connection with the preferred form of the invention, which pivot pin extends downwardly a distance sufficient to engage a support 53, such as the ground, and form a pivot to facilitate movement of wheels 54 and 55 on an axle 56 in response to rotation of wings 57 upon ignition of rockets 58 or the like fixed to the outer edges of the wings much in the manner of the preferred form of invention.

What I claim and desire to secure by Letters Patent is:

1. In a device of the character described, a landing gear comprising an axle having wheels at the ends thereof, a bolster on the axle, a sleeve mounted on the bolster, arms slidably engaged with the sleeve, wings on the arms, and means for moving said wings in opposite directions to cause ascent thereof.

2. In a device of the character described, a landing gear comprising an axle having wheels at the ends thereof, a bolster on the axle, a sleeve mounted on the bolster, arms slidably engaged with the sleeve, wings on the arms, means for moving said wings in opposite directions to cause ascent thereof, and means for limiting sliding movement of the wings.

3. In a device of the character described, a landing gear comprising an axle having wheels at the ends thereof, a bolster centrally disposed on the axle, a sleeve mounted on the bolster in transverse relation to the axle having spaced slots therein, arms slidably engaged with opposite ends of the sleeve, wings on the arms, means for moving said wings to cause ascent thereof, and pins on the arms engaged in said slots for limiting sliding movement of the wings.

4. In a device of the character described, a tube, wings secured to the outer ends of said tube, means for securing a rocket to the outer end of each wing, a rocket in each securing means, and launching and alighting means supporting said tube.

5. In a device of the character described, a tube, wings movably mounted in the outer ends of said tube, means for securing a rocket to the outer end of each wing, said tube having slots therein arranged in planes extending through positive and negative angles of incidence relative to said wings, and means in the slots for limiting movement of said wings relative to said tube to the length of said slots.

6. In a device of the character described, a tube, wings movably mounted in the outer ends of said tube, means for securing a rocket to the outer end of each wing, said tube having slots therein arranged in planes extending through positive and negative angles of incidence relative to said wings, means in the slots for limiting movement of said wings relative to said tube, and means in the slots for locking said wings at a reduced pitch relative to the extremities of said positive and negative angles of incidence.

7. In a device of the character described, a tube, wings secured to the outer ends of said tube, means for securing a rocket to the outer end of each wing, launching and alighting means supporting said tube, said launching and alighting means consisting of a cross member arranged transversely to the tube, and supporting means at each end of said member for engaging an alighting surface.

8. In a device of the character described, a tube having spaced slots therein arranged obliquely relative to the longitudinal axis of the tube, landing means engaged with said tube and arranged adjacent the middle portion of said tube in transverse relation thereto, a pair of rods, one of said rods extending within each end of said tube, wings on the outer end of each rod, means for securing a rocket to the outer end of each wing, a rocket mounted in each securing means, guide means on each rod engaging in the respective slots, and spring means biasing said wings toward each other, whereby the rockets when ignited act on said wings to cause rotation and spreading thereof relative to each other against tension of said spring means, the slot engaging guide means increasing the angle of incidence of said wings in response to centrifugal force created by said rockets to cause ascent of the device and decreasing the angle of incidence of said wings in response to action of said spring means when the force of said rockets is spent to cause descent of said device.

LAWRENCE W. BROWN.